United States Patent

Trenner

[11] Patent Number: 5,207,111
[45] Date of Patent: May 4, 1993

[54] ROTARY UNIT

[75] Inventor: Albrecht Trenner, Langendorf, Switzerland

[73] Assignee: Montech AG, Derendingen, Switzerland

[21] Appl. No.: 745,535

[22] Filed: Aug. 15, 1991

[30] Foreign Application Priority Data

Aug. 24, 1990 [DE] Fed. Rep. of Germany ....... 4026736

[51] Int. Cl.$^5$ ............................................. F16H 27/02
[52] U.S. Cl. ..................................... 74/89.17; 92/13.1; 92/111; 92/136; 192/143
[58] Field of Search ................ 74/89.17, 422; 92/13.1, 92/13.5, 111, 136; 192/143

[56] References Cited

U.S. PATENT DOCUMENTS

| | | | |
|---|---|---|---|
| 1,028,275 | 6/1912 | Purcell | 92/136 X |
| 1,806,669 | 5/1931 | Campbell | 92/13.1 X |
| 3,381,590 | 5/1968 | Rosenberg et al. | 92/111 X |
| 3,430,539 | 3/1969 | Freeman | 92/111 X |
| 3,605,409 | 9/1971 | Heese et al. | 92/136 X |
| 4,619,151 | 10/1986 | Trachman et al. | 192/143 X |
| 4,932,276 | 6/1990 | Treadwell et al. | 74/89.17 X |

FOREIGN PATENT DOCUMENTS

| | | | |
|---|---|---|---|
| 2335450 | 3/1975 | Fed. Rep. of Germany | 92/136 |
| 2054798 | 2/1981 | United Kingdom | 92/136 |

Primary Examiner—Allan D. Herrmann
Assistant Examiner—David W. Laub
Attorney, Agent, or Firm—Bachman & LaPointe

[57] ABSTRACT

The present invention discloses an apparatus for the rotation of, for example, workpieces to be machined, on a carrier which can be set in rotation by a pinion shaft with toothed strips via a rack, the rack being arranged perpendicularly to an axis of the pinion shaft in a cylinder bore of a housing slidably between covers closing the cylinder bore, pistons provided on the rack at each end forming with a respective cover a chamber which can be subjected to pressure medium, and the toothed strips of the pinion shaft meshing with the toothing of the rack between the two pistons, wherein the spacing of the toothing and pinion shaft or toothed strips is variable.

13 Claims, 6 Drawing Sheets

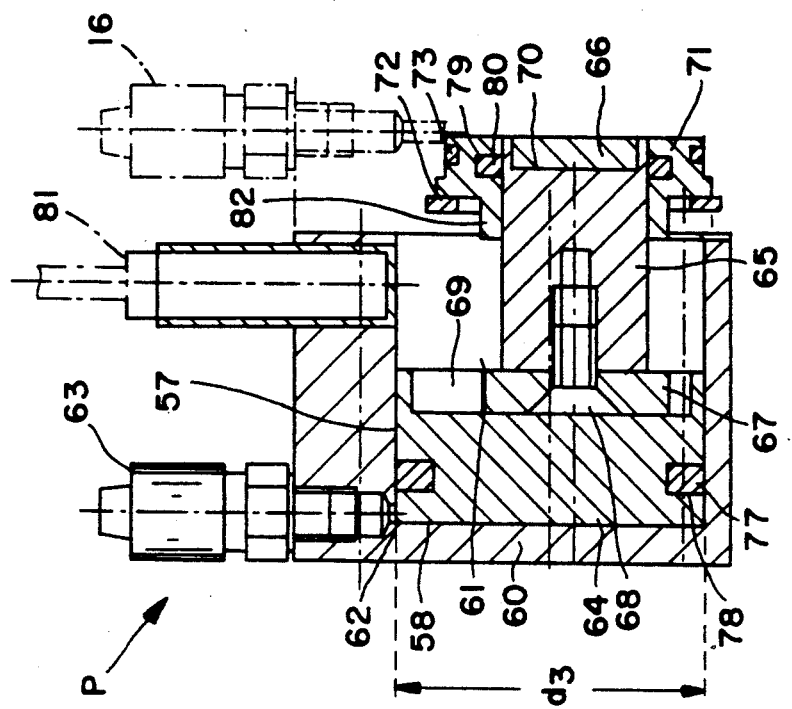
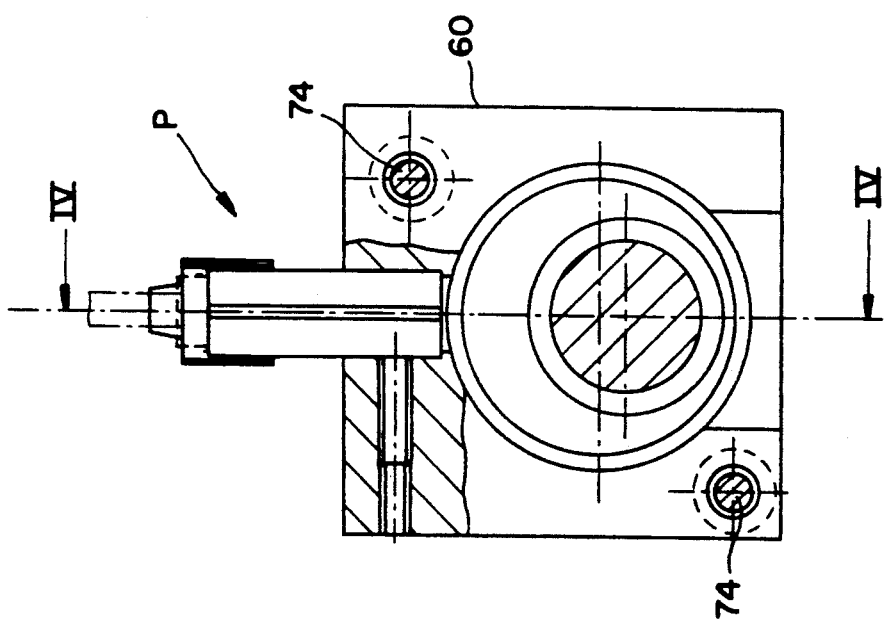
FIG. 4
FIG. 5

ROTARY UNIT

BACKGROUND OF THE INVENTION

The invention relates to an apparatus for the rotation of, for example, workpieces to be machined, on a carrier which can be set in rotation by a pinion shaft with toothed strips via a rack, the rack being arranged perpendicularly to an axis of the pinion shaft in a cylinder bore of a housing slidably between covers closing the cylinder bore, pistons provided on the rack at each end forming with a respective cover a chamber which can be subjected to pressure medium, and the toothed strips of the pinion shaft meshing with the toothing of the rack between the two pistons.

Rotary units of this type are known and are predominantly used for generating rotational movements, the rotational movements taking place only within a limited angle With rotary units of this type, in most. versions the rotational movements are generated as a result of the interaction of a rack and a pinion shaft. Preferably, a rack is guided between two pistons which form respectively between them and each of the covers closing the housing a chamber which can be subjected to a pressure medium. The pressure medium is controlled, for example, via proximity switches, by means of which the direction of rotation of the particular rotational movement is determined.

Since high dimensional accuracies are required for the machining of workpieces, it is necessary that a corresponding rotational movement be adjustable exactly in terms of the rotary angle. To guarantee such dimensional accuracy, most rotary units are equipped with corresponding devices determining the spacing between the toothed strip and the meshing pinion shaft. Thus, for example, there are known devices which by the use of two racks compensate a play which occurs under particular circumstances. Other devices provide under the rack a support bearing which is supported against the pinion shaft by means of appropriate spring devices or the like and which thereby compensates any play which occurs. The disadvantage of this device is that it either involves a high outlay or is exposed to increased wear as a result of the pressure force of the two toothing parts against one another.

Furthermore, in rotary units of this type, it is important that the end positions be reached in a damped manner. An abrupt break of the rotational movement leads to increased wear at those toothing points which are in engagement in the end positions, and because of the inertia of the workpiece it could result in the displacement of the latter, thus necessarily leading to an incorrect machining of this workpiece. To obtain such damped end positions, shock absorbers are introduced into the rotary units laterally in covers closing the pressure chambers and respectively damp the linear movement of the pistons in the region of the end positions.

The disadvantage of shock absorbers fastened in this way is that they can be sealed off only with great difficulty, and this repeatedly leads to pressure-reducing consequences within the chambers which can be subjected to pressure medium. Since the end positions of the rotational movement have to be varied according to the particular mode of machining of a workpiece, shock absorbers of this type cannot be installed unreleasably in the housing. A further problem is also presented by the size of such a rotary unit necessitated by the provision of such shock absorbers. Because the shock-absorber sleeves project on both sides, a rotary unit of this type often attains an undesirable constructional length.

Likewise, it is often shown to be a disadvantage of rotary units of this type that no intermediate position can be obtained between the end positions. But this is often necessary or would prove cost-effective in machining of a workpiece in which two work steps are required for the machining. With an appropriate intermediate position or within an appropriate intermediate stop, the two operations could be executed within one rotational movement.

SUMMARY OF THE INVENTION

The inventor's set object was to improve a rotary unit of the type mentioned, in such a way that the disadvantages mentioned are eliminated, a broadening of the scope of use becoming possible.

To achieve this object, the spacing between the toothing and pinion shaft or toothed strips is variable.

In a further exemplary embodiment of the invention, at least one stop is attached to the housing and interacts with a driver projecting from the rack. The two inventive ideas can be provided separately or together in one apparatus.

A rotary unit according to the invention forms, in a housing, a cylindrical bore, in which a rack is arranged between two pistons. A chamber which can be subjected to pressure medium is formed between the pistons and the housing in the region of each of the covers closing the cylindrical bore. Made in the middle of the housing is a bore, by means of which a pinion shaft is arranged so as to extend perpendicularly relative to the toothing of the rack. In the position of use, the toothing of the pinion shaft and that of the rack engage in one another. The rack itself has on both sides respective tenons which engage into corresponding recesses on this side of the pistons. By means of the recess, the pistons each form an annular collar. At the same time, however, the diameter of the tenons arranged on the rack is somewhat smaller than the inside diameter of the annular collar formed by the pistons.

The tenons are thereby not supported in the annular collar with an accurate fit, but have a corresponding play relative to this.

The tenons and the recesses in the pistons can perfectly well be of a design other than round. It is important, here, merely that the profile of the recess should correspond approximately to the profile of the tenon to be received and that a play be formed on one side. A threaded bore, through which a setscrew passes, is made in each tenon. The setscrew rests against the inner face of the annular collar formed by the pistons. At this point, the annular collar itself has a bore, by means of which the setscrew in the tenon can be reached and manipulated by means of an appropriate screwing tool. By an appropriate rotation of the setscrew, the rack can be varied in terms of its spacing relative to the pinion shaft within the above-described play between the tenon and annular collar.

Inaccuracies of fit or tolerances which can occur, for example, as a result of the production of the individual parts are compensated easily and quickly in this way.

Opposite the toothing of the rack, there is attached centrally to the rack a driver which passes through a corresponding slot, preferably in the form of a long hole, in the housing. The driver is connected releasably to the rack, for example by means of a screw bolt or the like. By way of this slot, the above-described setscrews in the tenons can also be reached through the bores in the annular collar of the pistons.

During the linear movement of the rack generated by subjecting the pistons to an appropriate pressure medium, the driver is also moved to a corresponding extent. In the region of movement of the driver, at least one stop, but preferably two stops, in particular on the right and left of the driver, are provided on the housing in corresponding guides, for example in dovetailed grooves. The stops are at the same time preferably so shaped that they serve simultaneously as a mounting for shock absorbers and as a mounting for, for example, a proximity switch. At the same time, they are preferably fixed releasably in the guide by means of setscrews. Their mutual spacing can thus be varied, this simultaneously influencing the length of the stroke movement of the pistons guiding the rack and also determining the angle of the rotational movement.

While the shock absorbers brake the stop, the proximity switches in the stops control the supply of pressure medium into the respective chamber. As a result of this interaction of the driver with the stop or stops, any end position can be determined quickly and easily within a specific maximum rotary angle. By the effect of the shock absorbers on the one hand and by the control mechanism via the proximity switches on the other hand, a desired end position is reached in a damped and jolt-free manner.

To obtain any intermediate position between the end positions, an appropriate mounted element can be attached to a rotary apparatus according to the invention.

This mounted element for obtaining an intermediate position of the rack consists of a housing which preferably has a cylindrical bore and in which is arranged a piston with a piston rod. The piston rod passes through a special cover which has at least one sealing ring towards the piston rod. In the position of use, the mounted element is fixed to the rotary unit by means of threaded bolts, threaded screws or the like, the special cover taking the place of the cover which, together with the piston, forms the chamber which can be subjected to pressure medium. This mounted element for obtaining an intermediate position is also assigned a connection to a pressure-medium source, with the result that the piston together with the piston rod in this mounted element can be moved by means of an appropriate pressure medium. The diameter of the piston for fixing the intermediate position is larger than the diameter of the piston guiding the rack in the rotary unit. This size difference guarantees that the pressure on the piston for the intermediate position is higher than the pressure of the piston guiding the rack.

To provide an intermediate position, the piston is moved in the direction of the rack by means of the pressure medium in a pressure space, the piston rod connected to the piston passing through the cover over a corresponding length. The length of the piston rod determines a first rotary angle for a corresponding rotational movement of the pinion shaft. Here too, a proximity switch ensures the electrical monitoring of the intermediate position reached.

During the penetration of the piston rod into the chamber between the cover and the piston guiding the rack, the rack is guided until the piston butts against the end face of the piston rod. Since, as mentioned before, the diameter of the piston determining the intermediate position is larger than that of the piston guiding the rack, the pressure on this piston can withstand the pressure exerted by the piston guiding the rack. An intermediate position is thus obtained, the driver projecting from the rack being located freely between the two stops. After the machining of the workpiece in this position, an appropriate valve is opened in the pressure space of the mounted element via a control mechanism, so that the pressure medium can flow out of the pressure space. The force of the piston guiding the rack can overcome the force of the intermediate position counter-acting it and push the piston rod back into the mounted element. The other end position can now be reached in the process of machining a workpiece.

In a further exemplary embodiment of a rotary unit according to the invention, attached to this is a connection plate for supplying pressure medium to the handling appliances fixed to the carrier. Such an arrangement makes it unnecessary to use hoses for feeding the pressure medium, for example for a gripper. The connection plate interacts, here, with an appropriately designed pinion shaft.

At the same time, the connection plate has a bore for receiving part of the pinion shaft. Channels which are connected to a pressure-medium source open into this bore. The pinion shaft possesses, in this region, annular channels which, in the position of use, are connected to the channels opening into the bore from the connection plate. Bores lead in turn from the annular channels into axially arranged channels which pass through the pinion shaft. The axially arranged channels open into the carrier plate or into a connection piece at the other end of the pinion shaft. This arrangement makes it possible to mount grippers or similar work units to be supplied with pressure medium on the carrier plate, without the need for external hose connections.

The principal inventive ideas of a rotary unit of this type are, above all, on the one hand the variability of the mutual spacing of the rack and pinion shaft and on the other hand the arrangement and interaction of the driver and end-position stop. By means of these devices, a corresponding rotary unit works with high accuracy and is of universal use. Its constructional length can be kept correspondingly compact.

BRIEF DESCRIPTION OF THE DRAWINGS

Further advantages, features and details of the invention emerge from the following description of preferred exemplary embodiments and from reference to the drawing, in which

FIG. 4 shows a longitudinal section through a mounted element on the rotary unit according to FIG. 1 along a line IV—IV in FIG. 5;

FIG. 5 shows a partially cut away top view of the mounted element according to FIG. 4;

DETAILED DESCRIPTION OF THE PREFERRED EMBODIMENTS

Figure 1:
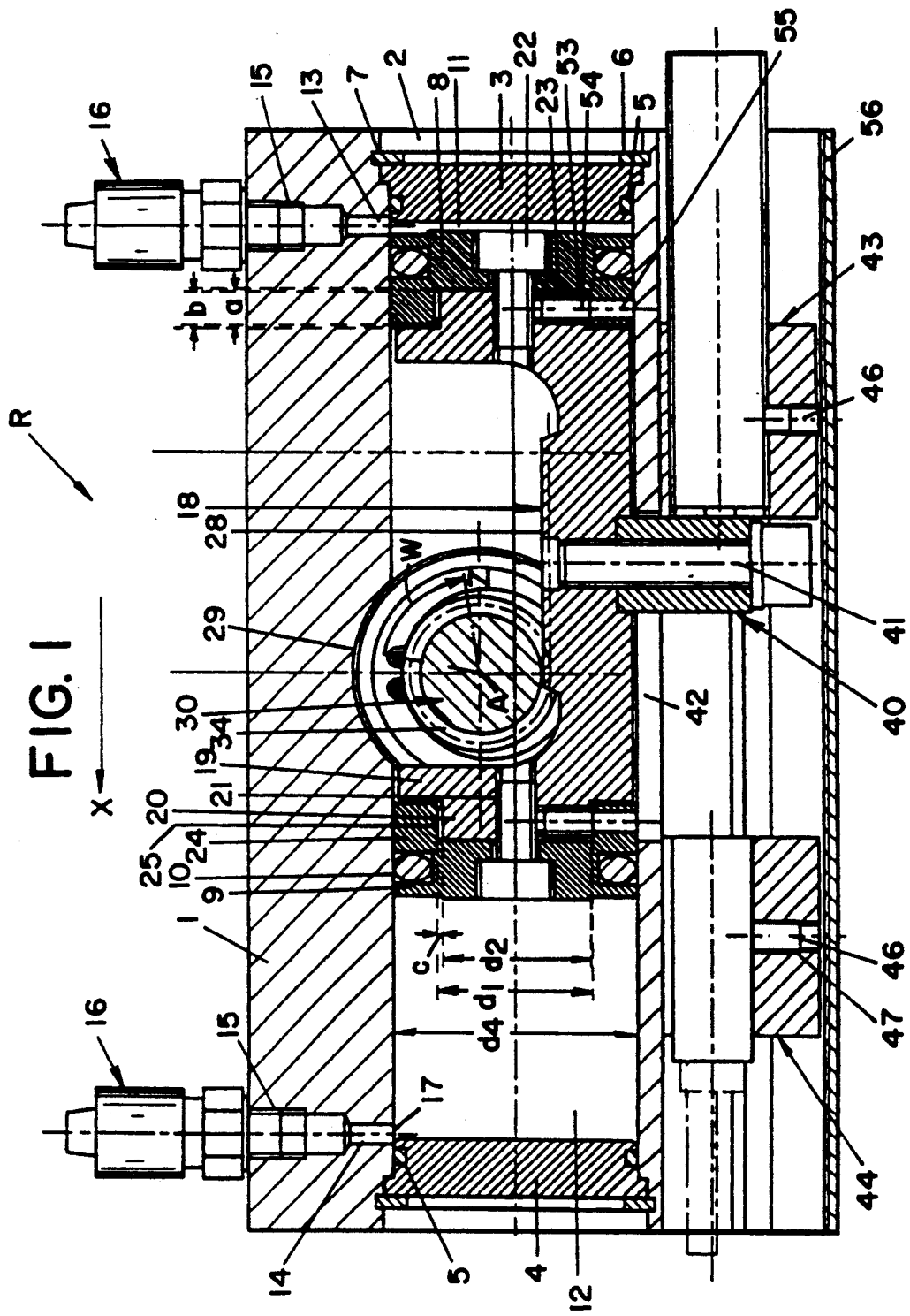
FIG. 1 shows a longitudinal section through a rotary unit according to the invention along a line I—I in FIG. 3.

According to FIG. 1, a rotary unit R according to the invention possesses a housing 1 with a cylinder bore 2. The cylinder bore 2 is closed in an airtight manner by means of a cover 3 and a cover 4. Sealing rings 5 embedded in the edge sides of the covers 3 and 4 ensure sealing, while retaining rings 6, inserted into annular grooves 7 provided especially for these in the cylinder bore 2, ensure a firm fit.

On the other side of the covers 3 and 4, pistons 8 and 9 are arranged within the cylinder bore 2. These pistons 8 and 9 ensure an airtight closure relative to the chambers 11 and 12 by means of sealing rings 10.

As a result of this arrangement, the respective chambers 11 and 12 are formed between the cover 3 and piston 8 and between the cover 4 and piston 9. Into each of these chambers 11 and 12 leads a channel 13 and 14 for the supply of a pressure medium, such as, for example, compressed air. The channels 13 and 14 are equipped with threaded bores 15 for receiving hose connections 16 for connection to a pressure-medium source. The pistons 8 and 9 are provided with a projection on their sides facing the covers 3 and 4, so that, when the pistons 8 and 9 are put against the covers 3 and 4, they do not pass across the inflow orifices 17 of the channels 13 and 14.

Arranged between the pistons 8 and 9 is a rack 18 having two disk-like flanks 19, on which tenons 20 are formed in turn.

Made in the tenons 20 are central threaded bores 21, into which threaded bolts 22 previously passing through the pistons 8 and 9 engage and thus connect the rack 18 firmly to the pistons 8 and 9, but allow a relative movement between the rack 18 and pistons 8 and 9. At the same time, the tenons 20 project into recesses 23 of the pistons 8 and 9, the depth a of the recess 23 corresponding approximately to the length b of the tenon 20. By means of the recess 23, the piston 8 or 9 forms in this region an annular collar 24 which has an inner wall 25 towards the tenon 20. However, the diameter d of the recess 23 is somewhat larger than the diameter $d_2$ of the tenons 20, so that a play of the width c is obtained between the tenon 20 and inner wall 25.

Figure 2:
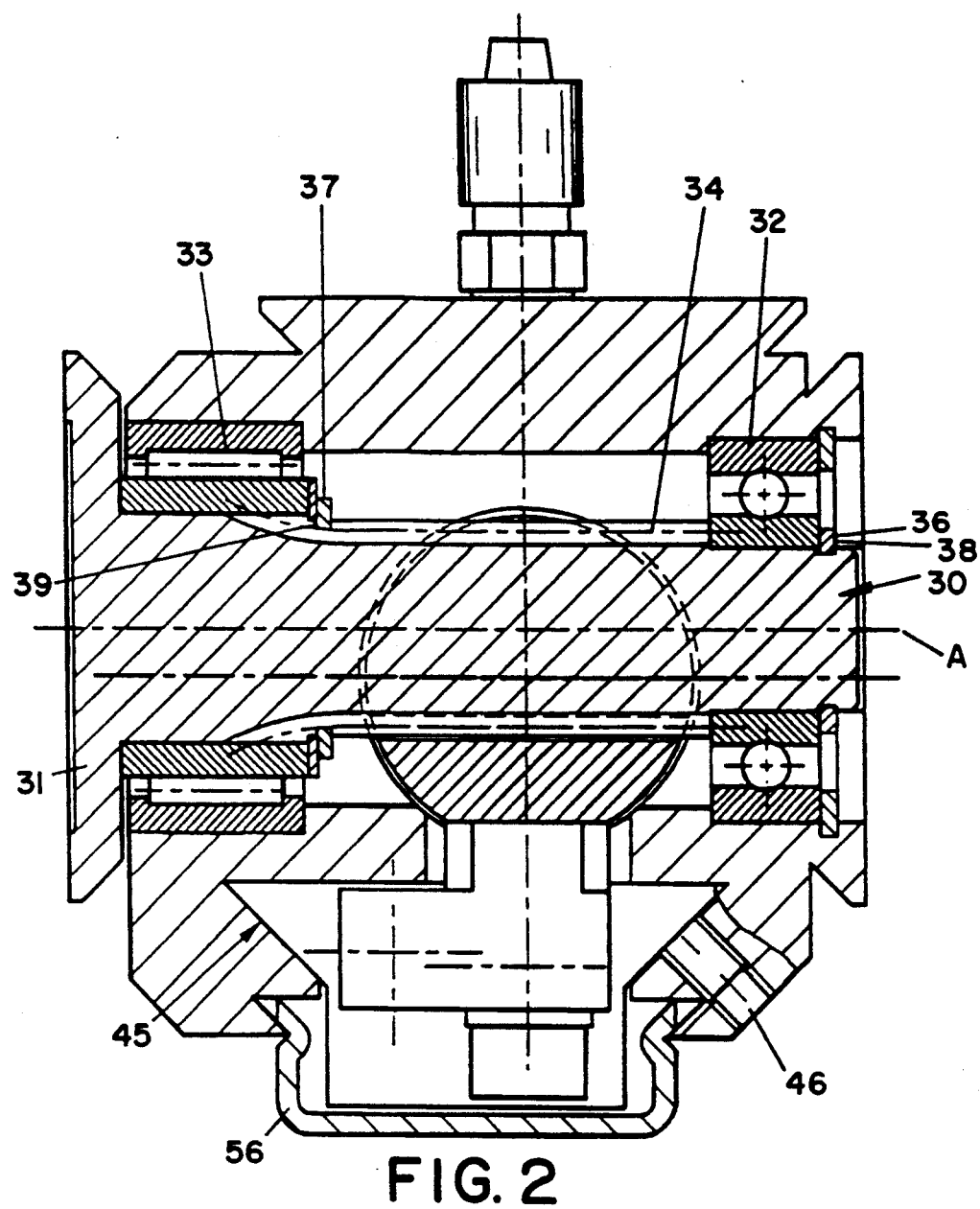
FIG. 2 shows a cross-section through the rotary unit along a line II—II in FIG. 3.
Figure 3:
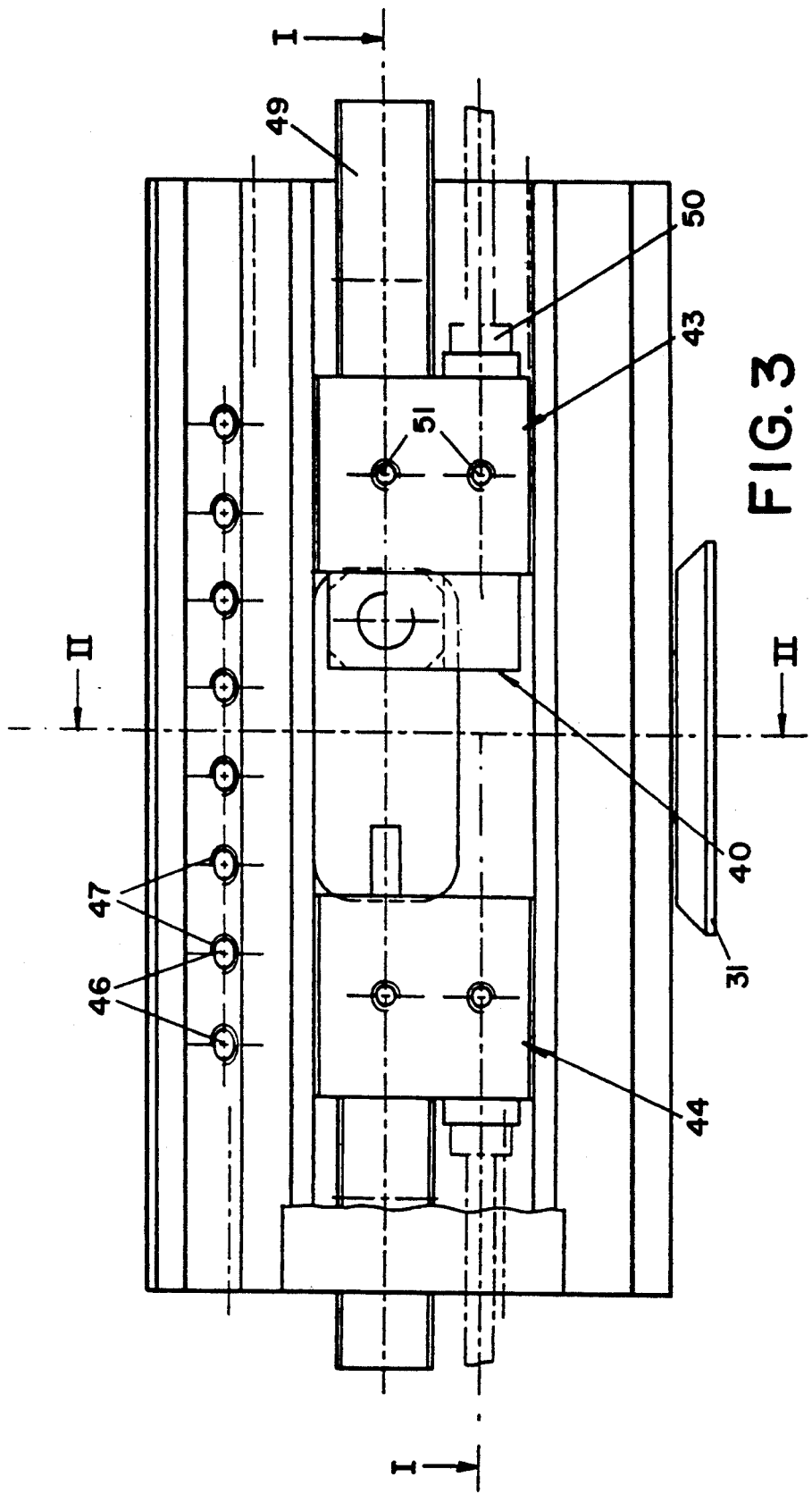
FIG. 3 shows a top view of the underside of the rotary unit according to FIG. 1.

The actual toothing 28 of the rack 18 is formed between the disk-like flanks 19. As can be seen especially in FIG. 2, the rack 18 is matched cross-sectionally in its outer form to the cylinder bore 2 in the housing 1, although the flanks 19 are likewise guided with play.

Perpendicularly to the toothed plane 28, the housing 1 has a transverse bore 29 approximately in the middle of the cylinder bore. A pinion shaft 30 passes through this transverse bore 29 and projects from the housing 1 on one side. There, it is equipped with a carrier disk 31, preferably of frustoconical shape. The pinion shaft 30 is rotatably mounted in a grooved ball bearing 32 on the one hand and in a needle bearing 33 on the other hand.

In the region between the grooved ball bearing 32 and the needle bearing 33, the pinion shaft 30 possesses a toothing in the form of longitudinal strips 34 which engage into the toothing 28 of the rack 18.

Retention for fixing the pinion shaft 30 in the bore 29 is obtained by retaining rings 36 and 37 which engage into annular grooves 38 and 39 provided for this.

Now when a pressure medium is introduced, for example, into the chamber 11 via the channel 13, the piston 8 and therefore necessarily also the rack 18 are moved in the direction x. The toothing 28 of the latter thereby meshes with the longitudinal strips 34 of the pinion shaft 30 and causes a rotation of the pinion shaft 30 about its longitudinal axis A in the direction Z. A rotary angle w is at the same time determined by the length of the stroke of the piston/rack unit. During this operation, pressure medium is expressed from the chamber 12 through the inflow orifice 17.

In order to cancel this movement, pressure medium flows in the opposite direction through the inflow orifice 17 into the chamber 12, with the result that the piston 9 together with the rack 18 is moved oppositely to the direction X. The channel 13 now serves as an outlet for the pressure medium located in the chamber 11. The toothing 28 once again runs on the pinion shaft 30 and thus brings about the rotational movement opposite to the direction of rotation Z. In the end position, the carrier disk 31 has once more assumed the initial position.

For fixing the rotary angle w at the pinion shaft 30 about its axis A individually, the length of the stroke can be limited within a specific range. For this, the rack 18 is assigned oppositely to its toothing 28 a driver 40 by means of a threaded bolt 41. The driver 40 passes through a slot 42 which is made in the housing 1 and which has approximately the form of a long hole. The driver 40 is assigned on both sides stops 43 and 44 for fixing an end position.

On the same side as the stops 43 and 44, the housing 1 possesses a guide 45 of dovetailed cross-section. The stops 43 and 44 are also shaped according to this dovetailed guide 45, and they are displaceable in the guide 45. For the final fixing of the stops 43 and 44, setscrews 46 penetrating into the housing 1 through corresponding threaded bores 47 are used. They press the stop 43 or 44 into the guide 45 and thus clamp it firmly. The stops 43 and 44 can be fixed at any point within the guide 45, especially in the region of the slot 42.

The mutual spacing of the two stops 43 and 44 determines the size of the rotary angle w of the pinion shaft 30 during the rotation Z about the axis A.

To obtain a damped braking of the stroke movement, shock absorbers 49 are integrated in the stops 43 and 44. For this purpose, shock absorbers 49 are fixed in a clamping manner in corresponding channels or mountings within the stops 43 and 44. The clamping is obtained by means of setscrews 51.

Likewise integrated in the stops 43 and 44 are proximity switches 50 which are secured in position by setscews 51. The proximity switches 50 perform the function of monitoring the end positions. Thus, when the stops 43 and 44 are displaced in position, the shock absorbers 49 and proximity switches 50 are automatically displaced with them.

The shock absorbers 49 ensure a damped and jolt-free butting of the driver 40 against the stop 43 or 44.

Since a high dimensional accuracy in respect of running distances and rotational movements is demanded of rotary units of this type, it is necessary to guarantee that the toothing 28 runs on the pinion shaft 30 without play between the longitudinal strips 34. To eliminate this play, the tenons 20 have bores 53 for setscrews 54. These setscrews are accessible to an appropriate screwing tool through the slot 42 and via bores 55 through the annular collar 24 of the pistons 8 and 9.

By means of the setscrews 54, as a result of appropriate rotation the entire rack 18 can be raised within the spacing c up against the longitudinal strips 34 of the pinion shaft 30, especially by unscrewing the setscrews 54 from the tenon 20, the setscrews 54 then being supported by means of the edges of the end face against the inner wall 25 of the annular collars 24 in the region of the bore 55. Any tolerances occurring between the longitudinal strips 34 of the pinion shaft 30 and the toothing 28 of the rack 18 can thus be compensated quickly and easily.

For protection against dust and especially for protection against unintentional contact with the fingers, the guide 45 is equipped over the entire length in the region of the stops with a protective cover 56.

The possibility of attaching a mounted element for an intermediate stop P constitutes a further improvement of a rotary apparatus R according to the invention.

An intermediate stop according to the invention consists, according to FIGS. 4 and 5, of a housing 60 which has an inner cylinder 57. In this inner cylinder 57 slides a piston 64 which limits a pressure space 58 on the one hand and a chamber 61 on the other hand. Into the pressure space 58 leads a channel 62, into which an appropriate hose connection 63 is screwed for the supply of a pressure medium. The pressure medium is required for moving the piston 64 in the direction e. The piston 64 is assigned a piston rod 65. The piston rod 65 is equipped on each of the two end faces with a damping disk 66 and 67, the damping disk 67 being fixed to one end face of the piston rod 65 by means of a countersunk screw 68 and bearing against the piston 64 within a recess 69. The damping disk 66 is fixed in a corresponding recess 70 in the piston rod 65, specifically in such a way that it projects a little beyond the end face of the piston rod 65. The piston rod 65 passes through a special cover 71 which, when the intermediate stop P according to the invention is used in the rotary unit R, takes the place of the cover 3 or 4 in FIG. 1.

The special cover 71 is likewise firmly fixed by means of retaining rings 72 and is sealed off relative to the inner wall of the cylinder bore 2 by a sealing ring 73.

The entire intermediate stop P is fixed to the housing 1 of the rotary unit R, for example by means of cylindrical screws 74.

So that the pressure medium can flow in or so that the piston 64 does not pass across the channel 62 completely and therefore close it, the piston 64 likewise possesses a step-shaped projection. For sealing the pressure space 58, the piston 64 has a sealing ring 77 which is located in an annular groove 78 specially made for this in the piston 64. In the special cover 71 too, a sealing ring 80 for sealing relative to the piston rod 65 is inserted in an annular groove 79.

The diameter $d_3$ of the piston 64 is larger than the diameter $d_4$ of the piston 8 or 9 of the rotary unit R. This guarantees that the pressure in the pressure space 58 causes an intermediate stop of the piston 8 or is absorbed on the end face of the piston rod 65.

In the position of use, the length of the stroke of the piston 64 in the direction e marks a first stop for the piston 8 or 9 and thus a first working position of the carrier disk 31 receiving a gripper or the like.

The disks 66 and 67 serve as run-on dampers of the piston rod 65 onto the pistons 8 or 9 or of the piston 64 onto the piston rod 65. The proximity switch 81 signals to the control that the intermediate position has been reached.

After the operation has ended in this position, the piston 64 is pushed back into its initial position by the piston 8 or 9. It is first ensured that the pressure medium can flow out of the pressure space 58 through the channel 62.

It is thereby possible to obtain a further working position which, as described above, is determined by the driver 40 and the stops 43 and 44 in their end position.

In a further improvement of a rotary unit R according to the invention, for a gripper or the like attached to the carrier disk 31 the pneumatic or hydraulic supply is integrated in the pinion shaft 30, instead of being via externally attached hoses.

Figure 6:
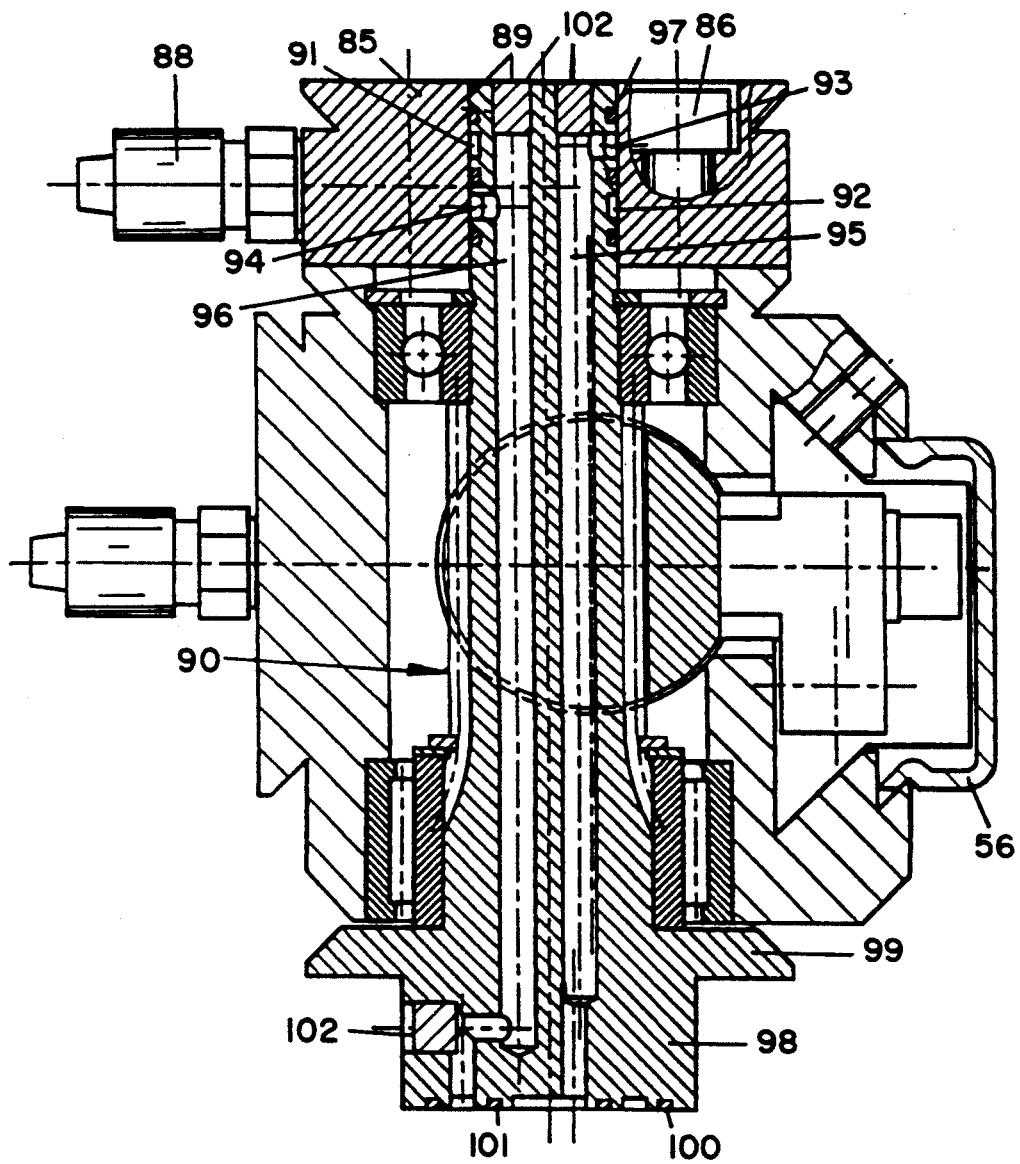
FIG. 6 shows a cross-section through the rotary unit according to FIG. 1 with a lower mounted element along a line VI—VI in FIG. 7.
Figure 7:
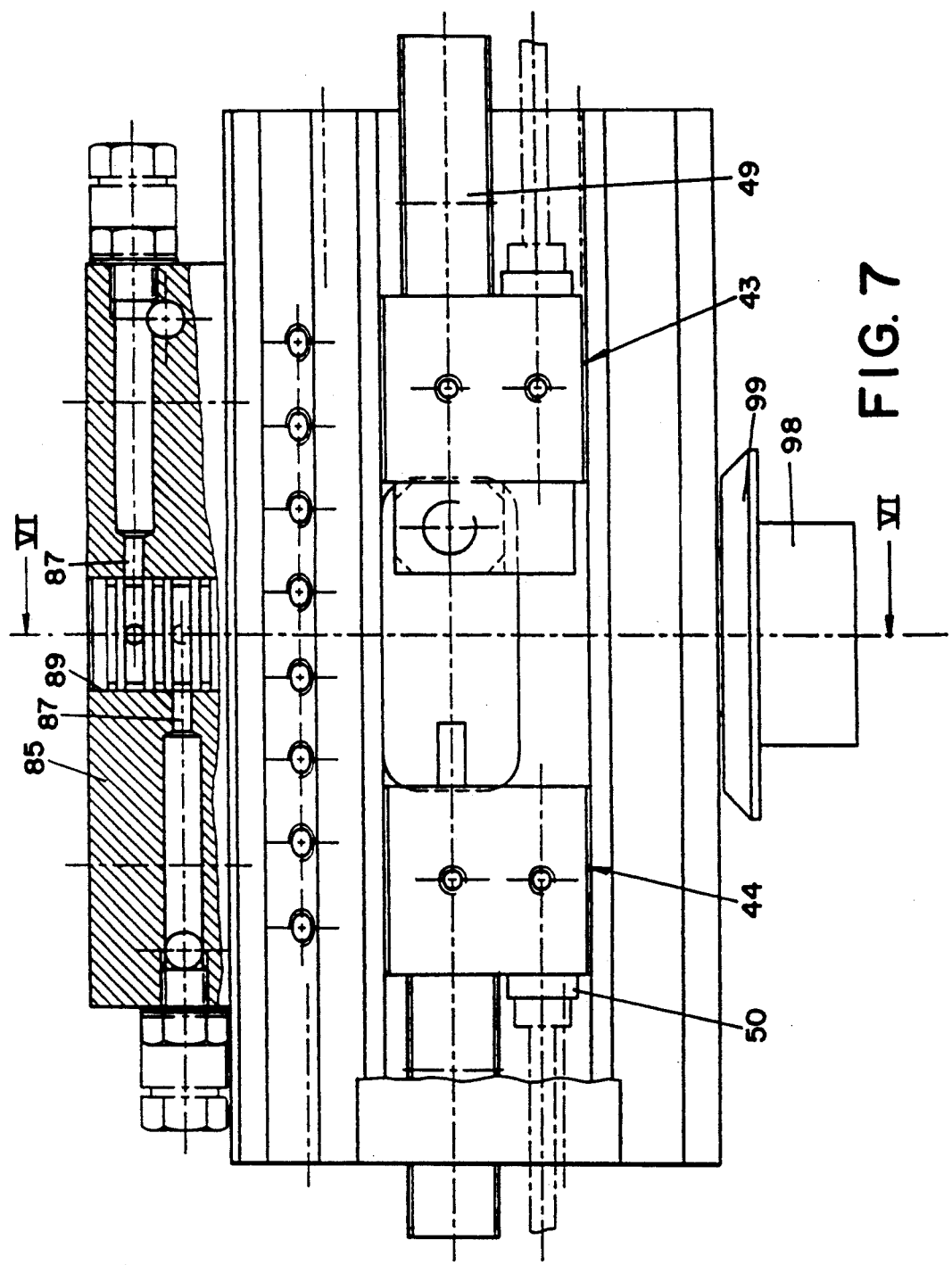
FIG. 7 shows a top view of the rotary unit according to FIG. 6.

For this, according to FIGS. 6 and 7, a connection plate 85 is screwed to a rotary unit R, preferably by means of cylindrical screw bolts 86 or the like. Channels 87 for the supply and removal of pressure medium are provided in such a connection plate 85. The pressure medium passes via an appropriate hose connection 88 into the channels 87. The channels 87 open into a bore 89, into which engages a specially shaped and extended pinion shaft 90. The pinion shaft 90 is equipped in the region with annular channels 91 and 92, each of the annular channels 91 and 92 having a bore 93 and 94 leading to channels 95 and 96 extending axially in the pinion shaft 90. The annular channels 91 and 92 are sealed off relative to the outside and from one another and relative to the inner wall of the bore 89 by means of sealing rings 97.

The channels 95 and 96 extending axially in the pinion shaft 90 open out from a connection piece 98, for example for a gripper or the like operated by a pressure medium, on a carrier plate 99.

Sealing rings 100 and 101 provided in the connection piece 98 ensure an airtight closure between the connection piece 98 and gripper or the like.

Plugs 102 close auxiliary bores for providing the channels 95 and 96 carrying the pressure medium.

The pinion shaft 90 corresponds in its external construction to the pinion shaft 30 described above and is mounted and correspondingly controllable within the rotary unit in the same way as the pinion shaft 30.

What is claimed is:

1. An apparatus for the rotation of workpieces to be machined, which comprises:
   a housing enclosing a cylindrical bore between covers thereof;
   a carrier for workpieces to be machined;
   a pinion shaft in the housing having an axis and having toothed strips, said pinion shaft adapted to rotate said carrier via a rack, wherein the rack includes toothing and is arranged perpendicularly to the axis of the pinion shaft in the cylindrical bore of the housing slidably between the covers of the housing;
   pistons provided on the rack at each end thereof forming with a respective cover a chamber which can be subjected to a pressure medium;
   wherein there is a range where the toothed strips of the pinion shaft mesh with the toothing of the rack between the pistons at each end of the rack;
   wherein said range is variable; and
   wherein the rack engages with a tenon in a recess of the piston, the tenon begin arranged with edge play to allow movement in the recess.

2. An apparatus according to claim 1 including at least one stop interacting with a driver projecting from the rack, wherein the stop is attached to the housing.

3. An apparatus according to claim 1, wherein located in the tenon is a setscrew which is supported by means of one edge of its end face against a shoulder of an annular collar.

4. An apparatus according to claim 1, wherein a bore leads through the annular collar forming the recess to the end face of the setscrew.

5. An apparatus according to claim 2, wherein an intermediate stop engages into at least one chamber.

6. An apparatus according to claim 5, wherein a piston rod passes through a cover and is connected at one end thereof to a piston which slides in an inner cylinder.

7. An apparatus according to claim 6, wherein the piston is adapted to be subjected to a pressure medium on the side away from the piston rod.

8. An apparatus according to claim 6, wherein the piston is assigned a proximity switch.

9. An apparatus according to claim 6, wherein the diameter of the piston which slides in an inner cylinder is larger than the diameter of the pistons provided on the rack.

10. The apparatus according to claim 2, wherein a pinion shaft engages on the other side from the carrier plate into a connection plate and has passing axially through it for the guidance of pressure medium at least one channel which is connected to a pressure-medium source via an annular channel and bores in the connection plate.

11. An apparatus for the rotation of workpieces to be machined, which comprises:
 a housing enclosing a cylindrical bore between covers thereof;
 a carrier for workpieces to be machined;
 a pinion shaft in the housing having an axis and having toothed strips, said pinion shaft adapted to rotate said carrier via a rack, wherein the rack includes toothing and is arranged perpendicularly to the axis of the pinion shaft in the cylindrical bore of the housing slidably between the covers of the housing;
 pistons provided on the rack at each end thereof forming with a respective cover a chamber which can be subjected to a pressure medium;
 wherein there is a range where the toothed strips of the pinion shaft mesh with the toothing of the rack between the pistons at each end of the rack;
 wherein said range is variable;
 wherein the rack engages with a tenon in a recess of the piston, the tenon being arranged with edge play to allow movement in the recess;
 including stops interacting with a driver projecting from the rack, wherein said stops are attached to the housing; and
 wherein the driver passes through a slot in the housing and the stops are arranged on both sides of the driver.

12. An apparatus according to claim 11, wherein the stops consist of a holder for at least one of a shock absorber and a proximity switch.

13. An apparatus according to claim 12 wherein the holder slides in a groove-like guide in the housing and is adapted to be fixed in the guide.

* * * * *